(12) United States Patent
Baills et al.

(10) Patent No.: US 6,907,027 B2
(45) Date of Patent: Jun. 14, 2005

(54) RADIO COMMUNICATION SYSTEM (75) Inventors: Stephane Laurent Baills, Toulouse (FR); Ouelid Abdesselem, Toulouse (FR); Karine Griesmann, Toulouse (FR)

(73) Assignee: Motorola Inc., Schaumburg, IL (US)

(*) Notice: Subject to any disclaimer, the term of this patent is extended or adjusted under 35 U.S.C. 154(b) by 362 days.

(21) Appl. No.: 09/732,437

(22) Filed: Dec. 7, 2000

(65) Prior Publication Data
US 2003/0026238 A1 Feb. 6, 2003

(30) Foreign Application Priority Data
Dec. 7, 1999  (EP) .............................................. 99403059

(51) Int. Cl.[7] .......................... H04L 27/00; H04B 7/26; H04J 3/06
(52) U.S. Cl. ....................... 370/345; 370/525; 455/515
(58) Field of Search ................................ 370/345, 350, 370/525, 526; 455/515

(56) References Cited
U.S. PATENT DOCUMENTS 5,535,215 A    7/1996 Hieatt, III
6,369,666 B1 * 4/2002 Simon et al. ............... 332/100
6,587,695 B1 * 7/2003 Jyrkka et al. ............... 455/515
6,597,681 B1 * 7/2003 Conner ....................... 370/347
6,647,000 B1 * 11/2003 Persson et al. ............. 370/330
2002/0004400 A1 * 1/2002 Fischer et al. ............... 455/456

FOREIGN PATENT DOCUMENTS

EP        0507384       10/1992
WO      WO99/39484      8/1999

OTHER PUBLICATIONS

Balachandran K. et al., "A proposal for EGPRS radio link control using link adaptation and incremental redundancy", Bell Labs Technical Journal, Jul.–Sep. 1999, Lucent Technologies, USA, vol. 4, No. 3, pp. 19–36.

* cited by examiner

Primary Examiner—Melvin Marcelo
(74) Attorney, Agent, or Firm—Sylvia Chen; Randall S. Vaas (57) ABSTRACT The invention relates to a radio communication system in which a time slot of a frame of a multiframe signal allocated to the frequency control channel is modulated using an 8PSK modulation scheme to contain a tone having a frequency which GMSK modulation is unsuited to generate. This enables COMPACT-format signals to be distinguished from GSM-format signals and ensures backwards compatibility with all existing GSM mobile stations.

29 Claims, 8 Drawing Sheets

●—● GRAY MAPPED MODULATING BITS
●—● SYMBOLS AFTER 3π/8 ROTATION

*FIG.9*

●—● GRAY MAPPED MODULATING BITS
●—● SYMBOLS AFTER 3π/8 ROTATION

RADIO COMMUNICATION SYSTEM

FIELD OF THE INVENTION

The invention relates to a radio communication system and radio devices used in the radio communication system, and to methods of transmitting and receiving signals in a radio communication system.

BACKGROUND TO THE INVENTION

The radio frequency spectrum is used by a large number of radio broadcast and radio communication systems. In order for the different radio broadcast systems and radio communication systems to operate correctly, conflict between the signals used in the different radio broadcast systems and radio communication systems must be avoided. This is generally achieved by allocating different frequency bands of the radio frequency spectrum to each of the different radio broadcast systems and radio communication systems.

The demand for capacity in radio communication systems is high and is expected to increase in the future. However, the available radio frequency spectrum is not unlimited, and so it is desirable to enable different radio communication systems to operate in at least partially overlapping frequency bands in order to provide the desired increase in capacity in radio communication systems to meet the expected demand.

One example of an existing radio communication system is the Global System for Mobile communication (GSM) system. The GSM system was initially designed to carry mainly voice traffic, and is unable to provide high data transfer rates for data traffic. As a result the EDGE packet radio system (EGPRS) has been proposed as a development of the GSM system, to provide improved data capacity. The EDGE packet radio communications system (EGPRS) provides both a classic EGPRS system, using the same signal format as the current GSM system, and a COMPACT system which uses a different system format. It is envisaged that radio frequency spectrum used by the classic EGPRS system and by the COMPACT system will overlap with the radio frequency spectrum currently used for the GSM system. In the following, reference will be made to the GSM format signals: however it will be clear that this description applies to classic EGPRS system signals as well as to GSM signals.

Both the GSM and the COMPACT radio communication systems are cellular radio communication systems in which a network of base stations is provided. Each base station provides access to the GSM network or the COMPACT network for a number of mobile stations within a cell associated with that base station, by means of a radio frequency interface.

The frequency bands allocated to the GSM radio communication system and to the COMPACT radio communication system are divided into a number of radio frequency channels. As indicated above, the radio frequency channels are common to the two systems. Signals on the radio frequency channels are arranged as multi-frame signals comprising a fixed number of frames, each of the frames containing within it a number of time slots. A base station and a mobile station communicate by means of logical control channels and traffic channels which are mapped onto specified parts of the transmitted multi-frame signals.

Figure 1A:
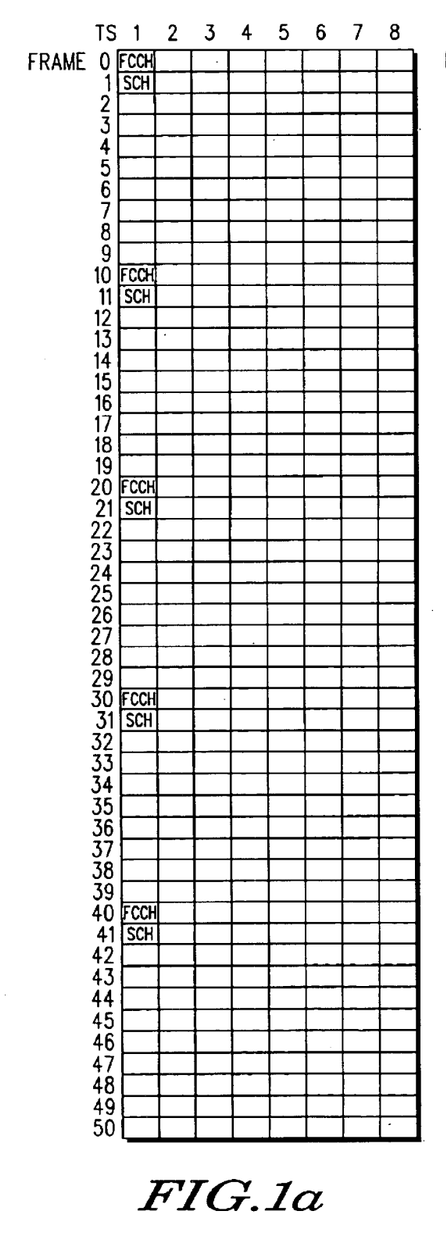
FIG. 1a) shows a schematic diagram of the multi-frame format defined for GSM signals.

A schematic diagram of the multi-frame format defined for GSM signals is shown in FIG. 1a. As can be seen, a multi-frame comprising 51 Time Division Multiple Access (TDMA) frames numbered 0–50 is used, each frame of the multi-frame being divided into eight time slots. A down link signal from the base station to the mobile station carrying the Broadcast Control Channel (BCCH) and Command Control Channel (CCCH) logic channels is shown, as an exemplary illustration of the multi-frame signal structure used in the GSM system. FIG. 1a also shows the presence of a Frequency Correction Channel (FCCH) containing a frequency correction burst (FCB) in timeslot 0 of frame nos. 0, 10, 20, 30 and 4, and the presence of a Synchronization Channel (SCH) containing a synchronization burst (SB) in timeslot 0 of frame nos. 1, 11, 21, 31 and 41.

Figure 1B:
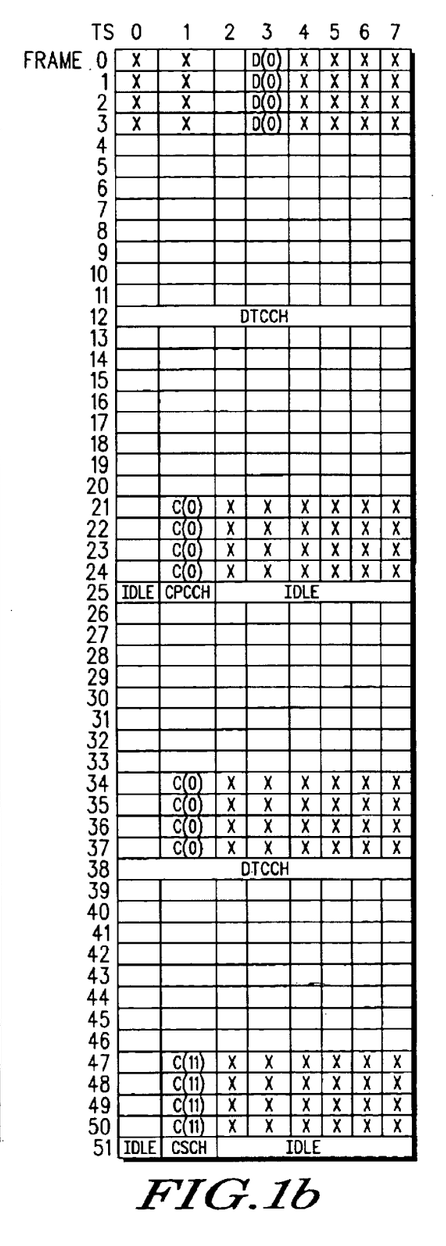
FIG. 1b) shows a schematic diagram of the multi-frame format defined for COMPACT signals.

A schematic diagram of the multi-frame format defined for COMPACT signals is shown in FIG. 1b. As can be seen, a multi-frame comprising 52 Time Division Multiple Access (TDMA) frames numbered 0–51 is used, each frame of the multi-frame being divided into eight time slots. A down link signal from the base station to the mobile station carrying the Compact Broadcast Channel Control (CPBCCH) and Compact Command Control Channel (CPCCCH) logic channels is shown, as an exemplary illustration of the multi-frame signal structure in the COMPACT system. FIG. 1b also shows the presence of a Frequency Correction Channel (CFCCH) containing a frequency correction burst (FCB) in timeslot 1 of frame no. 25, and the presence of a Synchronization Channel (CSCH) containing a synchronization burst (SB) in timeslot 1 of frame no. 51. It should be realized, however, that the frequency correction channel (CFCCH) and the synchronization channel (CSCH) in a multi-frame may be in any of corresponding ones of timeslots 1, 3, 5 or 7 of their respective frames.

For both the established GSM radio communication system and the new COMPACT radio communication system the frequency correction burst (FCB) is modulated to contain a tone and is provided to enable the mobile station to synchronize with a signal from the base station. The tone contained by the frequency correction burst (FCB) can easily be detected by the mobile station. If a frequency correction burst (FCB) is received, the mobile station can deduce that the currently received radio frequency channel also contains synchronization information, in the form of the synchronization burst (SB). The mobile station can then attempt to frame synchronize with a signal from the base station on the currently received radio frequency channel by attempting to locate the synchronization burst (SB) carried on the Synchronization Control Channel (CSCH).

However, the multi-frame structures used in the GSM radio communication system and the COMPACT radio communication system are different, as described above with reference to FIGS. 1a and 1b. As can be clearly seen from a comparison of FIGS. 1a and 1b, the synchronization burst (SB) in a GSM format multi-frame signal can be found at a position 10 or 11 frames after the position in the multi-frame of the frame containing the detected frequency correction burst (FCB): in contrast the synchronization burst (SB) in a COMPACT format multi-frame signal can be found at a position 26 frames after the position in the multi-frame of the frame containing the detected frequency correction burst (FCB).

In view of this, it has been proposed that the frequency correction burst used in the COMPACT system is modulated to contain a tone at −67.7 kHz offset from the radio frequency channel carrier, instead of a frequency correction burst (FCB) modulated to contain a tone at +67.7 kHz offset from the radio frequency channel carrier, as established for the GSM system. Since the tones carried by the COMPACT system frequency correction burst (FCB) and the GSM frequency correction burst (FCB) would be different, COMPACT mobile stations would be able to differentiate between a radio frequency channel carrying a GSM format multi-frame signal, and a radio frequency channel carrying a COMPACT format multi-frame signal.

However, a problem with this proposal is that a variety of different methods of detecting the frequency of the tone contained in the frequency correction burst (FCB) have been implemented in existing GSM compatible mobile stations in use today. One such method is to examine the power spectral density of a received signal around 67.7 kHz.

Figure 2:
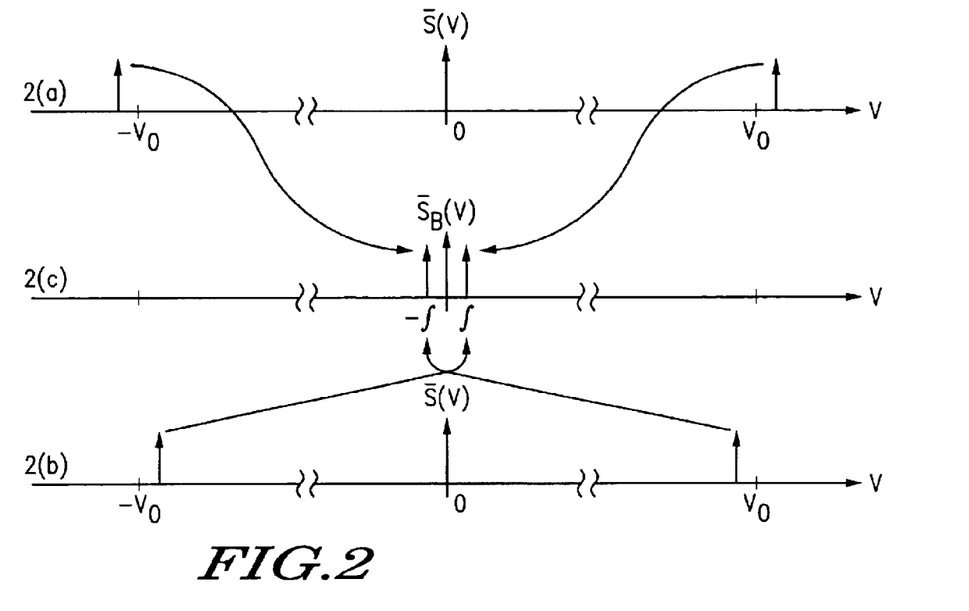
FIG. 2a) shows the power spectral density for a tone with a positive offset from a carrier.
FIG. 2b) shows the power spectral density for a tone with a negative offset from a carrier.
FIG. 2c) shows the power spectral density resulting from the down-converting of tones having the power spectral densities as shown in FIGS. 2a) and 2b)

However, as is well known, the power spectral density for tones offset by ±f relative to a radio frequency carrier yield the same spectrum once translated into a baseband signal in the handset. This is because the signals are real and therefore have a power spectrum having an even symmetry relative to zero. This result is illustrated by FIG. 2, where FIG. 2a) shows the power spectral density S(v) for a tone with a positive offset from the carrier and FIG. 2b) shows the power spectral density S(v) for a tone with a negative offset from the carrier. The power spectral density Sb(v) resulting from the down-converting of S(v) is shown in FIG. 2c) and is seen to result from the contribution of both frequency mirror tones.

Therefore any existing GSM mobile station which detects the frequency of the tone contained in the frequency correction burst (FCB) using a power spectrum density evaluation method will be unable to distinguish between a frequency correction burst (FCB) tone at +67.7 kHz offset from the carrier and a frequency correction burst (FCB) tone at −67.7 kHz offset from the carrier. Any such existing GSM mobile station receiving a frequency correction burst (FCB) tone at −67.7 kHz offset from the carrier would attempt a synchronization burst decode operation at a position 10 or 11 frames after the position in the multi-frame of the frame containing the detected frequency correction burst (FCB). This synchronization burst decode operation would be unsuccessful for the reasons outlined above. Thus the time required for the GSM mobile station to synchronize with a GSM signal would undesirably be extended by the time taken for the failed attempt to synchronize with a received COMPACT signal.

In addition, the mobile station uses the difference between the frequency of the received tone and the expected frequency of +67.7 kHz to adjust the local oscillator. Thus, a GSM mobile station which detects the frequency of the tone contained in the frequency correction burst (FCB) using a power spectrum density evaluation method will make erroneous adjustments to its local oscillator on receipt of a −67.7 kHz tone.

Thus the present invention seeks to minimize the time necessary for a receiving radio device to establish synchronization with a signal received from a transmitting radio device capable of providing an appropriate service to the mobile station.

SUMMARY OF THE INVENTION

In accordance with one aspect of the invention, there is provided a method of transmitting signals from a radio device in a radio communication system, wherein a signal comprises a plurality of frames, which carry control channels and traffic channels in a time division multiple access manner, each of the frames containing a plurality of timeslots, wherein; a frame assigned to at least one control channel is modulated using a first modulation scheme and at least one time slot of one of the frames is modulated to contain a tone, characterized in that the or each time slot containing the tone is modulated using a second modulation scheme different from the first modulation scheme, and the resulting tone has a frequency the first modulation scheme is unsuited to generate.

In accordance with a second aspect of the invention there is provided a radio device of a radio communication system, for transmitting signals comprising a plurality of frames, which carry control channels and traffic channels in a time division multiple access manner, each of the frames containing a plurality of timeslots, the radio device having modulating means for modulating a carrier signal, and control means for controlling the modulating means during transmission of a signal, wherein the control means controls the modulating means to modulate a frame assigned to at least one control channel using a first modulation scheme and the control means controls the modulating means to modulate at least one time slot of one of the frames to contain a tone, characterized in that the control means controls the modulating means to modulate the or each time slot containing the tone using a second modulation scheme different from the first modulation scheme, and the resulting tone has a frequency the first modulation scheme is unsuited to generate.

In accordance with a third aspect of the invention, there is provided a radio device for receiving signals of a radio communication system, which signals of said radio communication system comprise a plurality of frames, which carry control channels and traffic channels in a time division multiple access manner, each of the frames containing a plurality of timeslots, wherein a frame assigned to at least one control channel is modulated using a first modulation scheme and at least one time slot of one of the frames of a signal is modulated to contain a tone, the radio device having means for receiving and demodulating a signal, wherein a frame assigned to a control channel of a received signal is demodulated using the first modulation scheme, and signal processing means to determine the presence of a tone in the at least one time slot of one of the frames of a received signal, characterized in that the signal processing means is adapted to determine whether the tone in a control frame of a received signal is a predetermined tone, wherein the frequency of the predetermined tone is one resulting from modulation of the or each time slot containing the tone using a second modulation scheme different from the first modulation scheme, and is one the first modulation scheme is unsuited to generate.

In accordance with a fourth aspect of the invention a method of receiving signals of a radio communication system in a radio device, which signals of said radio communication system comprise a plurality of frames, which carry control channels and traffic channels in a time division multiple access manner, each of the frames containing a plurality of timeslots, wherein a frame assigned to at least one control channel is modulated using a first modulation scheme and at least one time slot of one of the frames of a signal is modulated to contain a tone, wherein a frame assigned to the at least one control channel of a received signal is demodulated using the first modulation scheme, and the presence of a tone in at least one time slot of one of the frames of a received signal is determined, characterized in that it is determined whether the tone in a control frame of a received signal is a predetermined tone, wherein the frequency of the predetermined tone is one resulting from modulation of the or each time slot containing the tone using a second modulation scheme different from the first modulation scheme, the frequency of the predetermined tone being one which the first modulation scheme is unsuited to generate.

An exemplary embodiment of the present invention will now be described with reference to the accompanying drawings.

DETAILED DESCRIPTION OF A PREFERRED EMBODIMENT

An exemplary embodiment of the invention will now be described with reference to the GSM and COMPACT radio communication systems as described above. However, the invention is not limited to these described radio communication systems and can be applied to other radio communication systems, as will be obvious to a skilled person.

Figure 3:
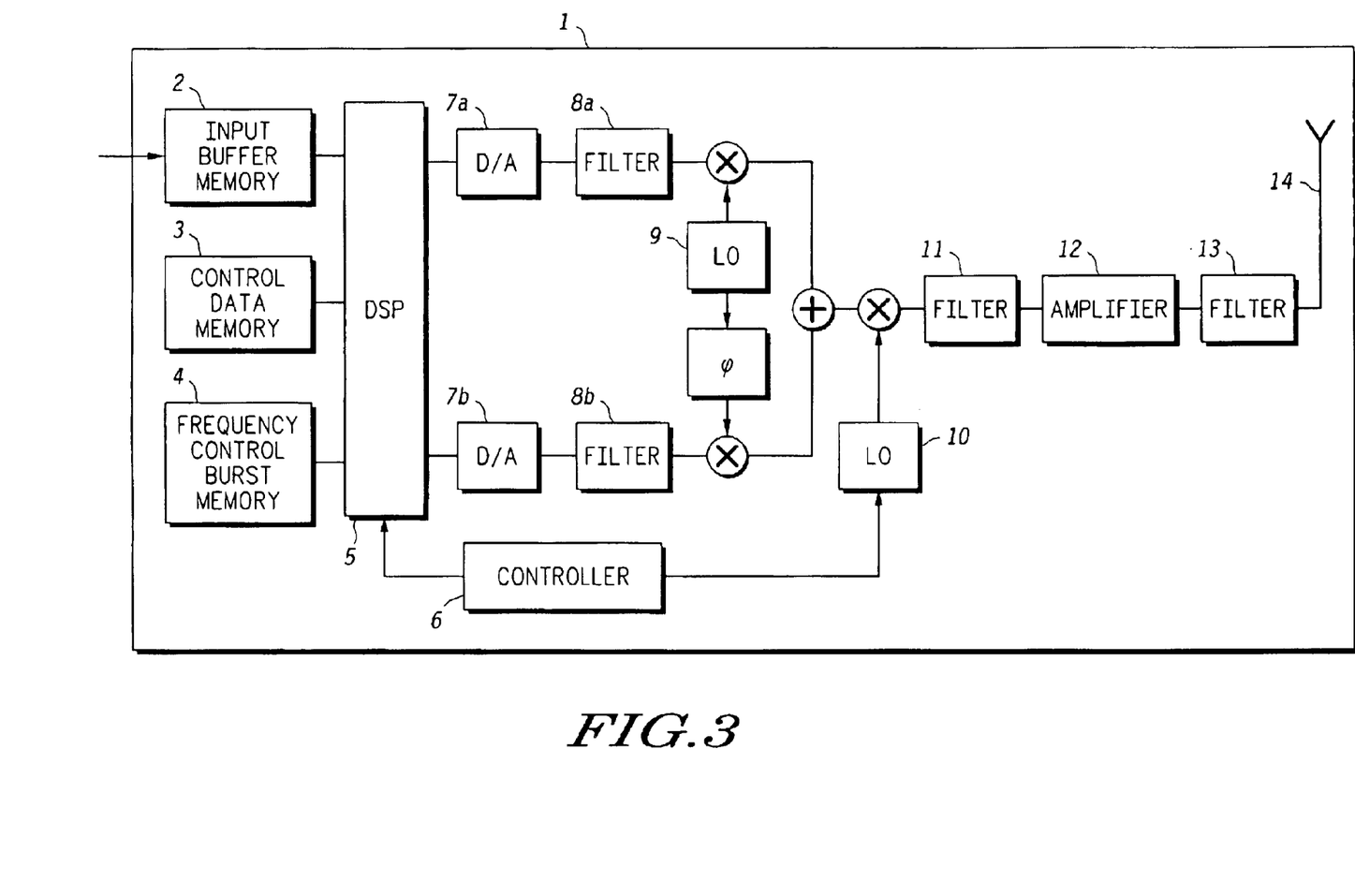
FIG. 3 is a functional block diagram of an exemplary base station.

First, one possible structure for the transmitting radio device of the radio communication system of the present invention will be described with reference to FIG. 3, which is a functional block diagram of a superheterodyne type base station of the COMPACT system. Details of the structure of such a base station which will be obvious to a skilled person and are not relevant to the present invention have been omitted for clarity. In addition, it will be obvious that other types of base station can be used, and the structure shown in FIG. 3 is only one example of a suitable type of base station.

A base station 1 has an input buffer memory 2 for receiving traffic data to be transmitted by the base station, and storing such data until transmission. The base station 1 also has a control data memory 3 for storing control signal data to be transmitted by the base station, and a frequency control burst memory 4 for storing frequency control burst data. Although the input buffer memory 2, the control data memory 3 and the frequency control burst memory 4 are shown as separate memories for clarity, clearly it is not necessary to provide physically separate memories, as will be appreciated by a skilled person.

Data to be transmitted by the base station is taken from one of the input buffer memory 2, the control data memory 3 and the frequency control burst memory 4 and input to a digital signal processor 5. The digital signal processor 5 is controlled by a controller 6 to generate an in-phase signal I and a quadrature phase signal Q in accordance with a modulation scheme. The digital signal processor 5 used in the COMPACT system base station is able to use both a GMSK modulation scheme or an offset 8PSK modulation scheme. However, the invention is not restricted to the use of GMSK and offset 8PSK modulation schemes and in general it is only necessary that the digital signal processor can use at least a first or a second modulation scheme. In this description the "first" modulation scheme refers to a GMSK modulation scheme, and the "second" modulation scheme refers to an offset 8PSK modulation scheme. The details of the processing performed by the digital signal processor 5, which includes interleaving and other processing known to a skilled person, have been omitted for clarity.

The in-phase signal I and quadrature phase signal Q output from the digital signal processor 5 are input to respective digital-to-analog converters 7a and 7b and respective filters 8a and 8b. The output of filters 8a and 8b are used to modulate the signal output from a local oscillator and an in-quadrature version of the signal output from the local oscillator 9, respectively. The resulting signals are combined and used to modulate the carrier signal supplied from local oscillator 10. The local oscillator 10 is controlled by the controller 6 to supply the correct signal for the required radio frequency channel. Finally the modulated carrier signal is filtered in filter 11, amplified in amplifier 12, and filtered in filter 13 prior to being transmitted by antenna 14.

A method of transmitting data in accordance with an embodiment of the invention will now be described with reference to FIG. 4.

As described above, the base station transmits signals containing both traffic channels and control channels, including the COMPACT Frequency Control Channel (CFCCH) containing the frequency correction burst.

Figure 4:
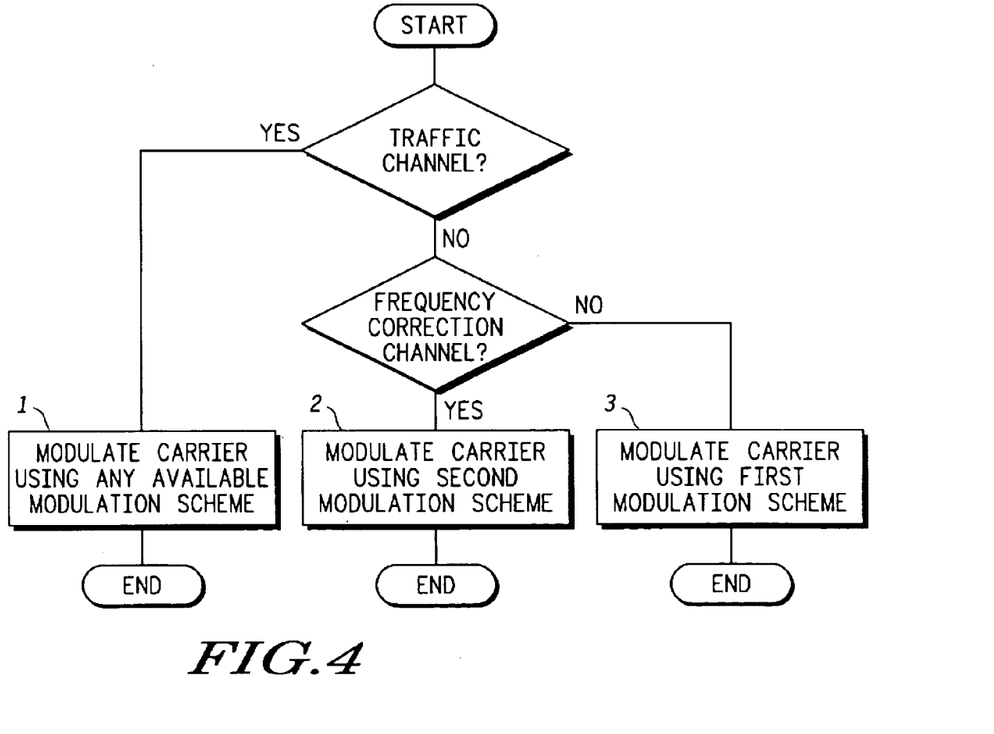
FIG. 4 shows a method of transmitting data in accordance with an embodiment of the invention.

When the COMPACT base station is transmitting a time slot containing a traffic channel, the digital signal processor 5 is free to use any modulation scheme which is available to the digital signal processor, as shown in step 1 in FIG. 4. Currently, both GMSK and offset 8PSK are approved modulation schemes for traffic channels in the COMPACT system. Clearly in situations in which two available modulation schemes are GMSK and offset 8PSK, the use of the 8PSK modulation scheme is advantageous for traffic data as it allows a greater throughput of traffic data.

When the COMPACT base station is transmitting a time slot containing a frequency correction burst, the digital signal processor 5 uses an offset 8PSK modulation scheme as a second modulation scheme, as shown in step 2 in FIG. 4. However the invention is not intended to be limited to the use of an 8PSK modulation scheme for Frequency Control Channel (CFCCH) modulation.

When the base station is transmitting a time slot containing a control channel other than the Compact Frequency Control Channel (CFCCH) containing the frequency correction burst, the digital signal processor 5 uses a GMSK modulation scheme as a first modulation scheme, as shown in step 3 in FIG. 4. Again, although the use of GMSK modulation scheme is currently the approved modulation scheme for transmission of a control channel in the COMPACT system, as well as for the GSM system, the present invention is not intended to be limited to the use of GMSK modulation scheme for control channel modulation.

The first and second modulation schemes of the present invention are such that the tone resulting from modulation using the second modulation scheme has a frequency which the first modulation scheme is unsuited to generate.

As a result, in a situation in which a mobile station is able to receive a signal in both a first format, in which the frequency correction channel is modulated with the first modulation scheme, and a second format, in which the frequency correction channel is modulated with the second modulation scheme, the mobile station can establish the format of the received signal from the frequency of the tone contained in the frequency correction channel.

In the embodiment of the invention described with reference to the exemplary radio communication systems, it is noted that the frequency control channel for GSM-format signals is modulated using GMSK: in contrast the frequency control channel for COMPACT-format signals is modulated using 8PSK.

The tone frequencies which can be generated using GMSK and offset 8PSK will now be described.

For continuous phase modulation systems such as GMSK, the transmitted signal is:

$$S(\dagger)=A \cos(2\pi v_0.\dagger+\emptyset<\dagger.a>+\emptyset_0) \qquad (1)$$

Where the information carrying phase is:

$$\emptyset<\dagger.a>=^\infty \Sigma a_n.\Phi(\dagger-nT) \qquad (2)$$

As will be known to a skilled person, any binary controlled phase modulation can be defined by the phase shift function $\Phi(\dagger)$ and the modulation index h. In the case of any MSK modulation, h=½. Usually the modulating bit stream is represented by the set $\{a_i\}$ of the signs of the phase variations associated with each bit. The GSM05.04 standard contains a formal mapping of GMSK used in the GSM system. In the GSM system, the bit stream is differentially encoded prior to modulation in order to gain some robustness—in this way, after coherent demodulator, the sampled data value on each branch is uncorrelated with respect to the preceding data values. Denoting the effective modulating bit stream that undergoes the differential encoding by $\{b_i\}$ the n th bit, $b_n$ appears at time $\dagger=nT$, maps to $a_n$, and causes a phase variation of $\Phi(\dagger)$ which adds to the phase variation $\emptyset(\dagger)$ associated to the previous bits (as depicted in Equation 2).

Figure 5:
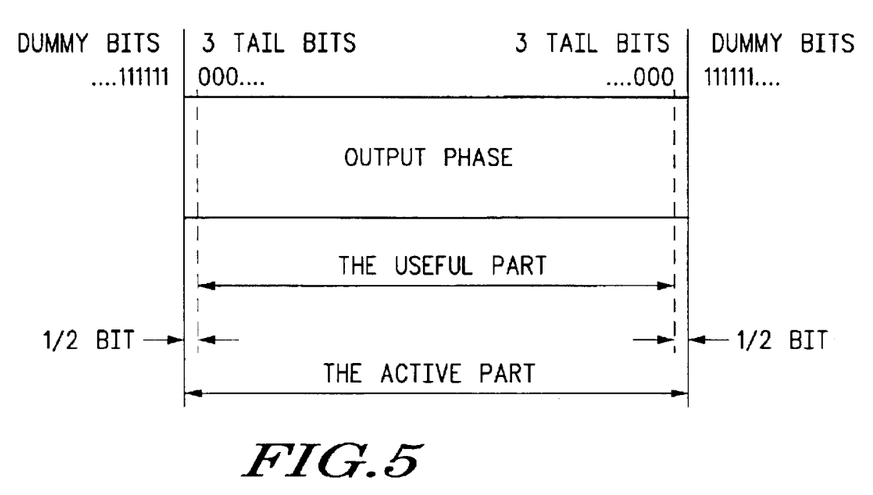
FIG. 5 shows the structure of a GSM frequency correction burst.

The generation using a GMSK modulation scheme of a frequency correction burst in the GSM system will now be described with reference to FIG. 5. In the GSM system, a time slot is divided into 156.25 bit periods. A particular bit period within a time slot is referenced by a bit number (BN), with the first bit period being numbered 0, and the last (¼) bit period being numbered 156. Different types of burst exist in the system-one characteristic of which is their useful duration. The GSM 05.02 standard defines a frequency correction burst (FCB) of 147 bits useful duration. The useful part of a burst is defined as beginning from half way through bit number 0. The first and last bits to enter the differential encoder prior to the modulator ($d_i$=1) are called dummy bits, they define the start and the stop of the active and the useful part of the burst, as illustrated in FIG. 5. Nothing is specified about the actual phase of the modulator output signal outside the useful part of the burst. The period between bursts appearing in successive time slots is termed the guard period. When the timeslot containing the frequency correction burst is to be transmitted the carrier signal transmitted by the transmitter is modulated using the frequency burst data.

The tones generated by GMSK modulation as outlined above can be obtained by reasoning, in both time and frequency domains at baseband, on a possible scenario for the phase shift function $\phi(\dagger)$ Two pure tones are obtained corresponding to linear trajectories of the phase shift function, inducing a $\pm\pi/2$ phase accumulation per bit period in steady state, or conversely a $\pm 2\pi$ phase accumulation after 4 bit periods. These tones are pure sine waves since they are generated using a constant phase shift and have a frequency offset from the carrier frequency by ±67.7 kHz since the modulating symbol rate in the GSM system is 270.833 ksym/s.

A tone having a zero offset frequency is induced by restricting the dynamic of the phase accumulation oscillation to its minimum, which is obtained with a 2 alternate bit period pattern owing to the filtering effect of the GMSK pre-shaping filter. The signal in Equation 1 is then equivalent to a low modulation index sine wave frequency modulated tone. The corresponding spectrum of this tone displays frequencies located at $\pm n \times F_m$—where $F_m$ corresponds to the frequency of the modulating sine wave, i.e. 135.46 kHz since the modulating symbol rate is 270.833 ksym/s. The energy repartition is expected to happen between the fundamental and the first harmonic given the low modulation index. Those harmonics are sufficiently high to be filtered out by the baseband filter of the handset receiver, whereas the desired energy around the zero frequency can be generated by allocating an average to the phase shift function, i.e. $\emptyset_0 \neq 0$.

Figure 6:
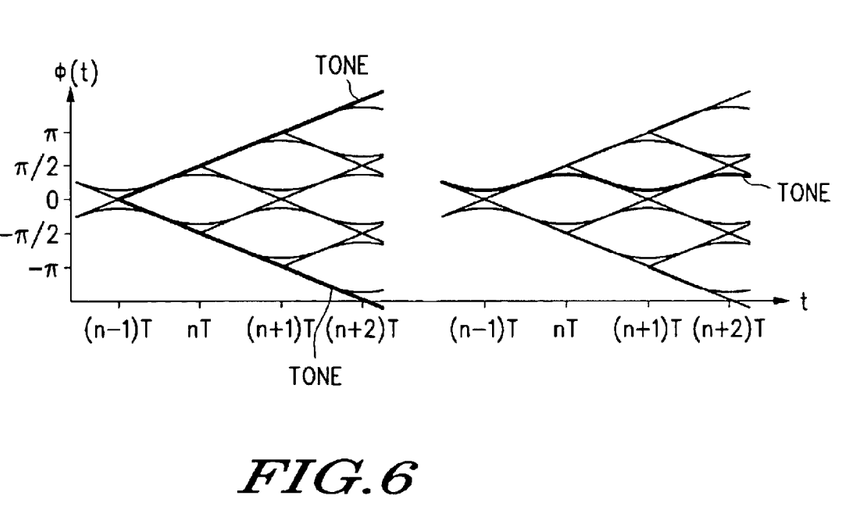
FIG. 6 is a first trellis diagram illustrating phase trajectories for tones formed using GMSK modulation.

FIG. 6 is a trellis diagram illustrating the phase trajectories for tones at ±67.7 kHz and a DC tone.

Two tones may obtained by tweaking a pattern with a pseudo-period of 5 bit duration yielding $\pm 2\pi$ phase accumulation after an 8 bit period, leading to a tone having a frequency around ±33.85 kHz since the modulating symbol rate is 270.833 ksym/s. Since the phase change is not constant, the tone is not a pure sine wave. Only odd harmonics are generated owing to the odd parity of the resulting signal generated by Equation 1. Those harmonics are sufficiently high to be filtered out by the baseband filter of the handset receiver, except possibly the rank 3 harmonic located at ±101.56 kHz, which is on the verge of the inband bandwidth for GSM. It is believed that the post filtering vestigial energy at ±101.56 kHz is small enough compared to the energy located at ±33.85 kHz so as to avoid convergence of any detection algorithm on that harmonic.

Figure 7:
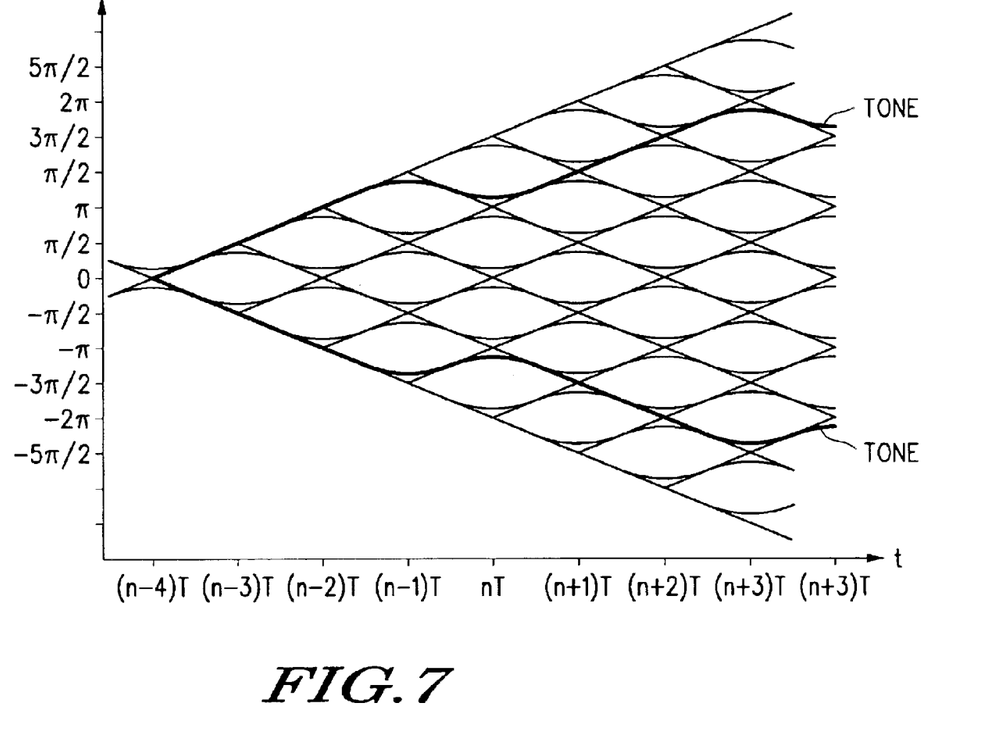
FIG. 7 is a second trellis diagram illustrating phase trajectories for tones formed using GMSK modulation.

FIG. 7 is a trellis diagram illustrating the phase trajectories for tones at ±33.85 kHz.

For GMSK, the phase variation trajectories determine the various set of $\{a_i\}$ as per equation 2. The corresponding $\{b_i\}$ are deducted after NRZ to RZ mapping and reverse differential decoding.

Thus it can be seen from the above that modulation using GMSK can generate pure sine waves or sine waves with acceptable harmonics only at 0, ±33.85 kHz and ±67.7 kHz relative to the carrier frequency using baseband filtering required to meet GSM selectivity.

The tones which can be generated using offset 8PSK and their associated bit patterns will now be described with reference to FIGS. 8–12.

Figure 8:
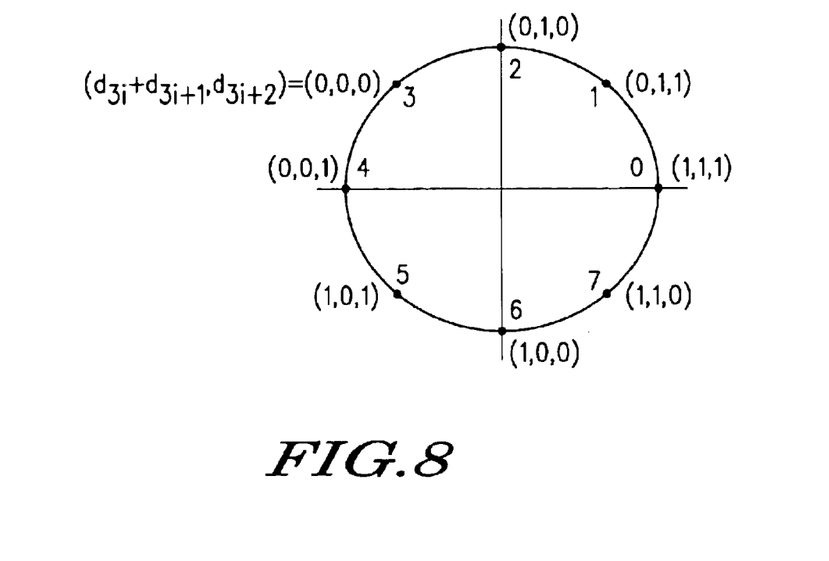
FIG. 8 shows the basic constellation diagram for 8PSK.

The basic constellation diagram for 8PSK is shown in FIG. 8. Although the phase difference between the eight symbols is π/4 the GSM05.04 standard specifies that the constellation itself is successively shifted by 3π/8 in consecutive symbol periods leading to a phase shift function rate as small as π/8 per symbol. This phase shift function rate amounts to a ±2π phase accumulation after 16 symbol periods yielding tones of ±16.92 kHz since the modulating symbol rate is 270.833 ksym/s.

Figure 9:
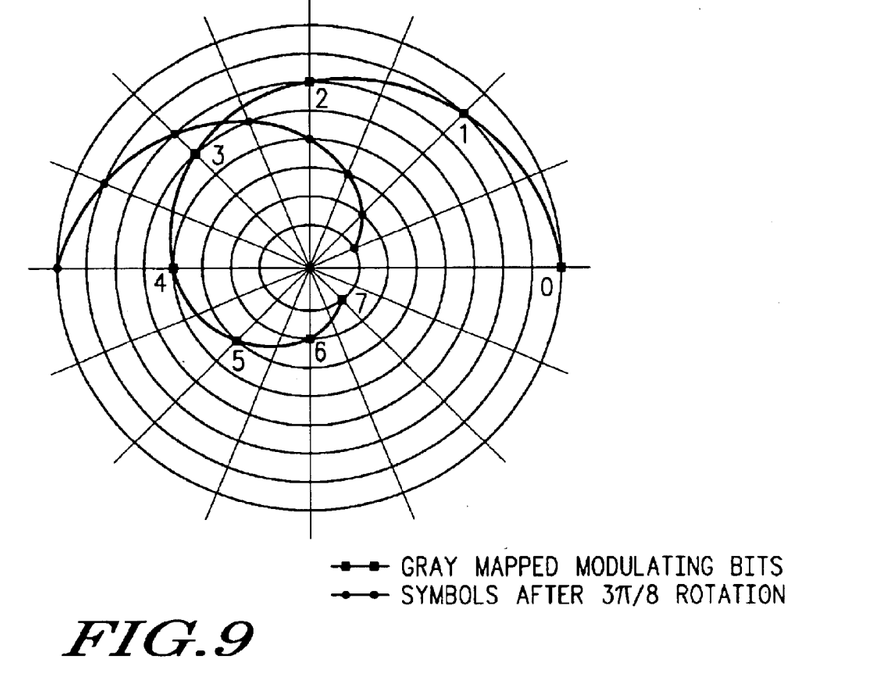
FIG. 9 illustrates the generation of a first symbol sequence used to generate a tone in accordance with one embodiment of the invention.
Figure 10:
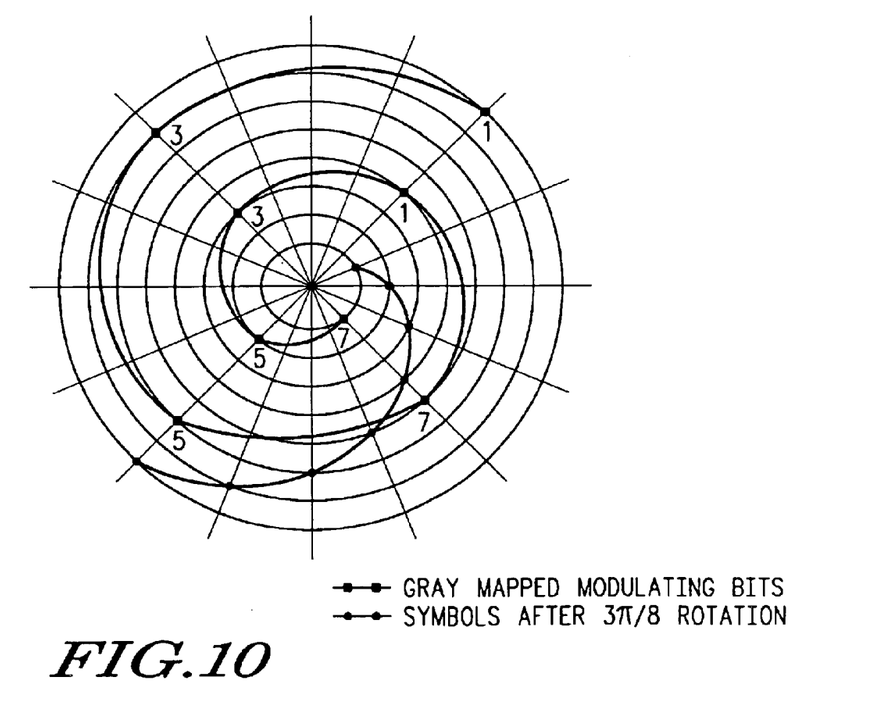
FIG. 10 illustrates the generation of a second symbol sequence used to generate a tone in accordance with one embodiment of the invention.
Figure 11:
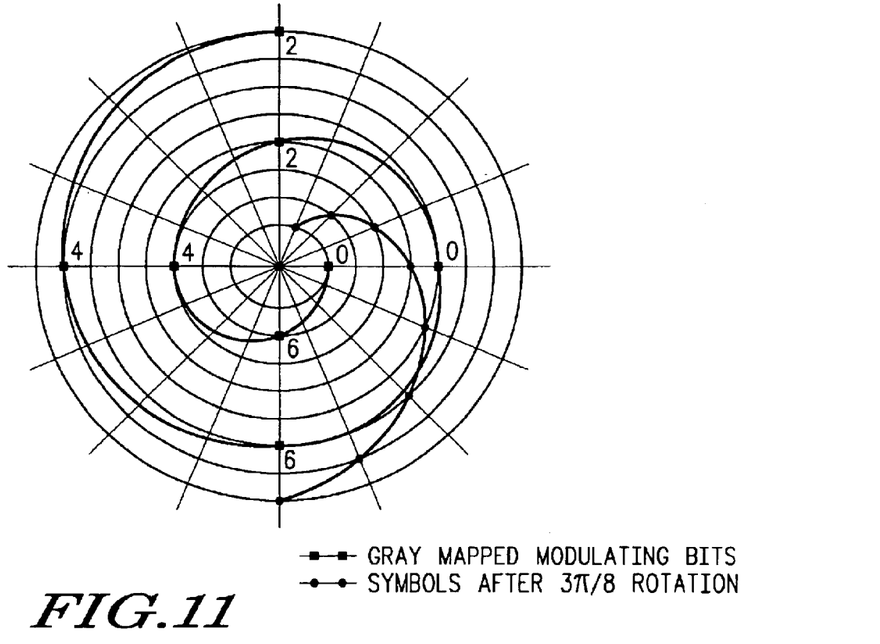
FIG. 11 illustrates the generation of a third symbol sequence used to generate a tone in accordance with one embodiment of the invention.

FIGS. 9 to 11 depict the constellations instantiations of 8PSK constellations resulting in a ±π/8 offset per symbol. In each of these diagrams, each successive circle represents the constellation at the next symbol time, the original being that of FIG. 8. The differences between the diagrams arise from differences in the initial phase offset and the use of positive and negative constellation shifts between successive symbols, as will be clear to a skilled person.

From these figures it is clear that tones can be generated by transmitting the following 8PSK modulated symbols in the sequences indicated below:

| Symbols | Tone Location | Pattern Periodicity |
| --- | --- | --- |
| 7 5 3 1 7 5 3 1 | −16.9 kHz | 4 symbols/12 bits |
| 0 6 4 2 0 6 4 2 | −16.9 kHz | 4 symbols/12 bits |
| 7 6 5 4 3 2 1 0 | 16.9 kHz | 8 symbols/24 bits |

Clearly, the indicated symbol series are repeated throughout the length of the frequency correction burst. Thus data necessary to generate the above symbols can be stored in the frequency control burst memory 4, as will be known to the skilled person.

Figure 12:
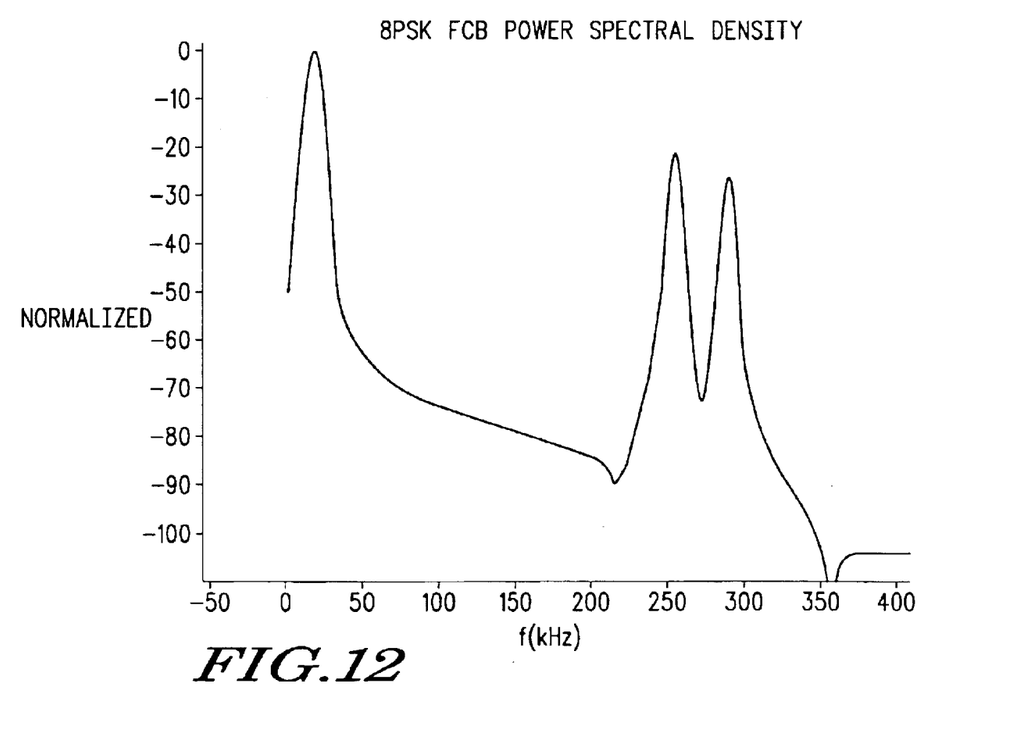
FIG. 12 shows the frequency spectrum of a tone generated in accordance with one embodiment of the invention.

FIG. 12 shows the frequency spectrum of the above tones. Simulations were performed with Matlab, with a 5 bit period spread for the linearised GMSK pulse described in GSM05.04. The 0.17 dB power flatness due to 8-PSK modulation results in harmonics observed in the 250–300 kHz range with a suppression in excess of 22 dB relative to the fundamental. Those harmonics fall far off the 200 kHz band allocated to the RF channel and will not be seen after filtering.

The series were inserted in a frequency control burst in place of the fixed bits and tailed bits, and raised cosine power shaping was applied to the resulting bursts before performing the fast fourier transforms. It is worth restating at that stage that the tail bits were omitted, to aid to the spectrum edification—since they aim at setting the channel coder which is not used for FCB generation.

Thus it can be seen that offset 8PSK is able to generate a pure sine wave having a frequency offset from the carrier frequency by ±16.9 kHz.

It is clear from the above discussion that the use of 8PSK modulation scheme for modulation of the frequency control channel (CFCCH) results in the generation of a tone having a frequency which a GMSK modulation scheme is unsuited to generate.

One of the 8SPK tones in the above table may be used as the frequency correction burst tone for the COMPACT system.

Figure 13:
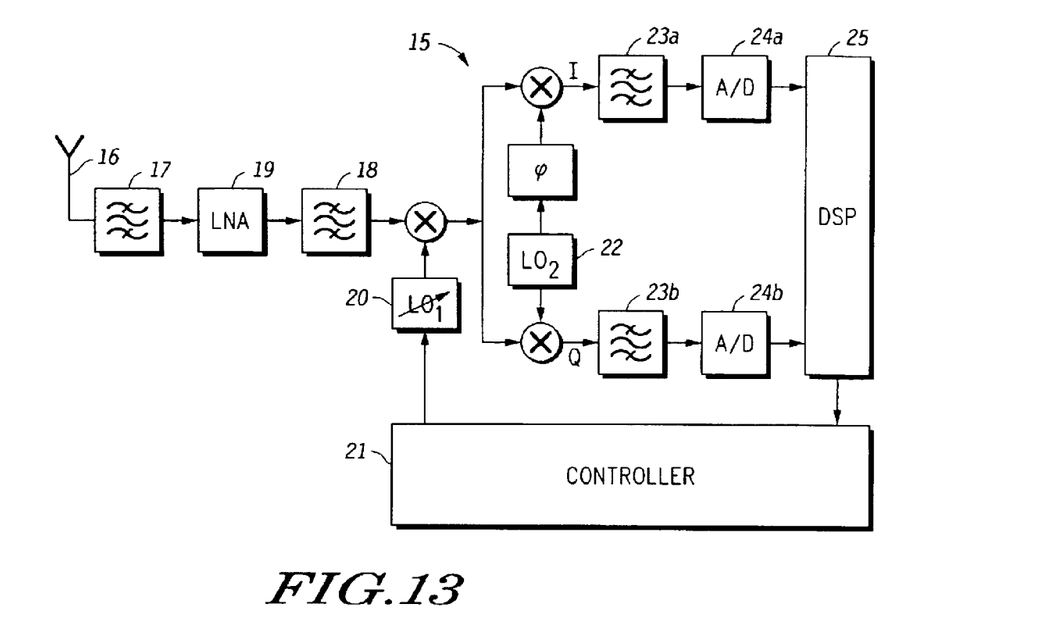
FIG. 13 is a functional block diagram of an exemplary mobile station.

One possible structure of the receiving radio device of the radio communication system of the present invention will be described with reference to FIG. 13, which is a functional block diagram of a superheterodyne type mobile station of the COMPACT system. Details of the structure of such a mobile station which will be obvious to a skilled person and are not relevant to the present invention have been omitted for clarity. In addition, it will be obvious that other types of mobile station can be used and the structure shown is only one example of a suitable type of mobile station.

The mobile station 15 has an antenna 16 for receiving signals transmitted from the base station. The received signal is filtered and amplified in filters 17, 18 and amplifier 19 prior to being converted to base band by mixing with the channel carrier signal from local oscillator 20. A controller 21 controls the local oscillator to select an appropriate channel to receive a signal.

The base band signal is mixed with a signal from a second local oscillator 22 and also with a in-quadrature signal from a second local oscillator 22 and the resulting signals are respectively filtered in filters 23a and 23b and input to analog-to-digital convertors 24a and 24b. The resulting in-phase and quadrature signals are input to a digital signal processor 25 for further processing. The digital signal processor 25 communicates with the controller 21, as shown.

Figure 14:
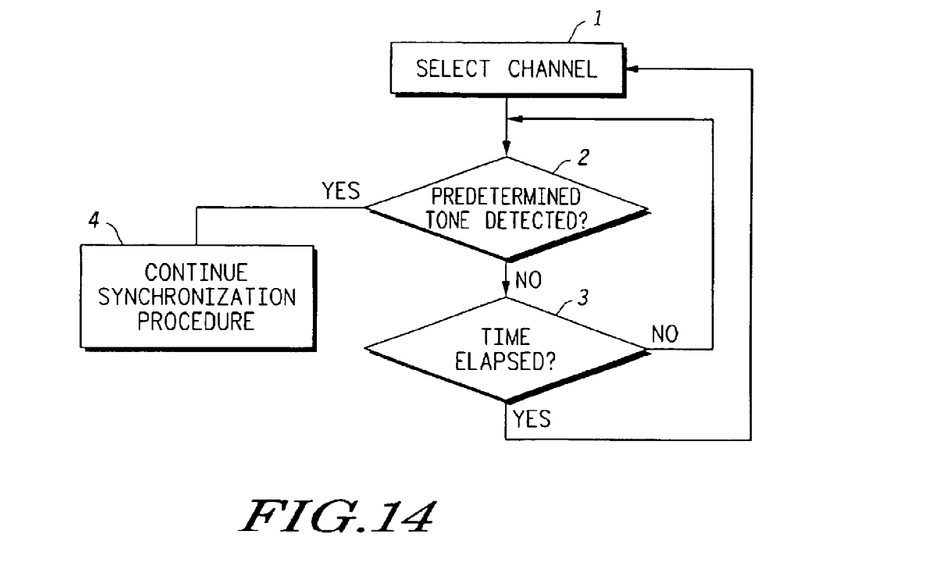
FIG. 14 shows a method of selecting a channel in a mobile station in accordance with an embodiment of the invention.

A method of selecting a channel in a mobile station will now be described with reference to FIG. 14.

As indicated above, the mobile station must detect a frequency correction burst in order to synchronize with a signal received from a base station. Thus in order to receive signals in the COMPACT format, the mobile station must detect a tone contained in a frequency correction burst of a COMPACT-format signal, i.e. a predetermined one of the tones indicated in the above table having a frequency of ±16.9 kHz.

In order to detect a frequency correction burst on a particular radio frequency channel, the controller 21 of the mobile station selects that channel by controlling the local oscillator 20 to output the carrier for that channel as shown (step 1). The digital signal processor 25 evaluates whether or not a frequency correction burst has been received by detecting whether a predetermined tone, as indicated above, is received (step 2). A number of techniques for determining the frequency of a received tone, for example de-rotation and accumulation of the received energy, detection and estimation of zero crossings, and energy estimation around a frequency are known, and will not be described further.

If a predetermined tone is not received within a period corresponding to the expected duration between frequency correction bursts, which corresponds to the duration of a 52 frame multi-frame for a COMPACT signal, the controller 21 deduces that the received radio frequency channel does not contain any synchronization information (step 3) and the controller 21 controls the local oscillator to select a new channel (step 1).

In contrast, if the predetermined tone is received (step 2) the controller 21 deduces that the received radio frequency channel contains relevant o synchronization information, and continues the known synchronization procedure (step 4).

However, it should be noted that it is possible to determine whether the received tone is offset above or below the frequency of the carrier. Furthermore, it is also possible to detect the difference between the two symbol sequences giving rise to the −16.9 kHz tone indicated above on the basis of the phase of the signal and the symbol sequence received.

Thus in accordance with a particularly advantageous embodiment of the invention, the plurality of different tones provided by the present invention can be used to convey additional information to mobile stations able to distinguish between the different tones.

Such additional information, for example in a COMPACT system, might relate to the services offered by the cell so that the mobile station can determine after a frequency correction burst is received whether it is desirable to synchronize with the current carrier or to search for a new channel based on the services required by the mobile station and the available services offered by the cell. One example of such service is whether data transfer is supported by the cell.

Thus, in accordance with this advantageous embodiment of the invention, the tone transmitted by a base station in a cell which supports data transfer (i.e. a ±16.9 kHz tone, for example) may be different from the tone transmitted by a base station in a cell which does not support data transfer (i.e. a −16.9 kHz tone, for example). This determination is also represented by step 3 shown in FIG. 14.

This embodiment allows cell selection time to be reduced since the time penalty incurred in carrying out a synchronization procedure which is wasted if the cell does not support the services required by the mobile station is avoided Clearly, the different predetermined tones made available in this advantageous embodiment of the invention can be used to indicate any service capability or other information, such as the identity of the service provider.

Although an exemplary mobile station of the invention and the operation of the exemplary mobile station is described above as if the mobile station is adapted to receive signals only in a first radio communication system format (i.e. the COMPACT system format), in practice, advantageously the mobile station is adapted also to receive signals in a second radio communication system format (i.e. the GSM/(E)GPRS system format).

The invention can be implemented by minor software changes in the base station and the mobile station to produce the new set of tones, and the ability to detect them respectively. It is foreseen that any existing algorithm implemented in a mobile station for detecting the 67.7 kHz frequency correction burst tone used in the existing GSM system can be modified in a simple manner to also detect the new tones.

Although the invention has been described with reference to the use of 8PSK as the second modulation scheme when GSMK is used as the first modulation scheme, it is clear that other modulation schemes can be used for both first and second modulation schemes. In addition with regard to the described radio systems, in which GMSK modulation is used for the modulation of all control channels in the GSM system and is also used for control channels other than the frequency correction channel (CFCCH) in the COMPACT system, it is clear that modulation schemes other then 8PSK can be used as the second modulation scheme, to modulate the frequency correction channel (CFCCH) in the COMPACT system.

Advantageously the second modulation scheme should be chosen such that the tone generated by the second modulation scheme has a frequency which is not detected by a mobile station adapted to detect a tone generated by the first modulation scheme.

The use of the present invention has advantages which are clear from a consideration of the GSM and CONTACT systems. In particular, the nature of signals borne by received radio frequency carriers, i.e. either GSM/(E)GPRS signals or COMPACT signals, and hence the need for logical synchronization on those radio frequency carriers, is known to a mobile station before a synchronization burst decode is attempted.

As a result, failed decoding attempts, which give rise to an extended time for synchronization by COMPACT-capable mobile stations on COMPACT carriers, and also degrade time for synchronization for non COMPACT-capable mobile stations in an environment with COMPACT carriers are avoided. As a result, the radio communication system service level perceived by both COMPACT-capable and non COMPACT-capable stations is maintained.

In this respect, it should be noted that the existing GSM mobile stations will not detect COMPACT format signals, thus ensuring full backward compatibility which is highly desirable. This is achieved because the existing GSM mobile stations detect a tone at ±67.7 Khz and a tone having a frequency of ±16.9 kHz will not be detected as a frequency correction burst.

Furthermore, in accordance with an advantageous embodiment of the invention, a COMPACT handset can infer the services supported by a COMPACT cell prior to frame synchronization, thus avoiding time penalties incurred should the expected service not be available giving rise to rejection of cell by the mobile station after synchronization.

Thus since in accordance with the invention the tone contained in the frequency correction burst of the COMPACT system has a frequency generated by 8PSK modulation, and that hence is inherently different from the one used for the GSM/(E)GPRS system, substantial time can be saved on cell selection in the COMPACT system, since an unwanted cell can then be discarded after detection of a frequency correction burst.

For example, the cell selection time for a COMPACT mobile station could be reduced by ~120 ms by avoiding at attempt at synchronization with a GSM/(E)GPRS carrier. This could save 4.8 s should the 1900 MHz band contain powerful but non-COMPACT carriers, and potentially 9.6 s should a retry mechanism be implemented.

On the other hand, a non-capable COMPACT handset trying to select a cell in an environment with COMPACT carriers will not detect a COMPACT signal frequency correction burst implemented in accordance with the invention. More specifically, a non-capable COMPACT handset would see a COMPACT carrier as a regular traffic carrier, rendering the invention backward compatible with previous generation GSM handsets.

In this situation the cell selection time is reduced by ~50 ms relative to a situation in which a COMPACT carrier is investigated before a successful selection, or up to 100 ms per failed synchronization attempt with a COMPACT carrier should a retry mechanism be implemented.

If the frequency correction bursts in accordance with the invention are implemented containing more than one possible tone, and the operator uses that capability for indicating the type of services supported by the cell, cell selection time would be further decreased. For example, if a Class C COMPACT mobile station receives a frequency correction burst indicating that data traffic is not supported, the mobile station can reject that cell after receiving the frequency correction burst without needing to synchronize with the signal and decode it. The cell selection time would then be reduced by an extra ~720 ms relative to the situation if the advantageous embodiment of the invention were not used.

Thus the invention enables a COMPACT specific frequency correction burst generated using 8PSK and located at 16.92 kHz offset from the carrier, to distinguish between GSM/(E)GPRS and COMPACT cells. In an advantageous embodiment of the invention, the COMPACT-compatible mobile station is provided with information relating to the service capability of the cell enabling undesirable cells to be rejected after the decoding of the frequency correction burst without requiring synchronization with the carrier to establish system information. The time required for synchronization to both GSM/(E)GPRS and COMPACT in an environment with COMPACT carriers is thus minimized for all mobile stations, keeping backward compatibility with previous generation GSM mobile stations.

Finally, it should be noted that the invention also allows a decrease in complexity for the scheduling of synchronization.

What is claimed is:

1. A method of transmitting signals from a radio device in a radio communication system, wherein a signal comprises a plurality of frames, which carry control channels and traffic channels in a time division multiple access manner, each of the frames containing a plurality of timeslots, wherein:
   a frame assigned to at least one control channel is modulated using a first modulation scheme and
   at least one time slot of one of the frames is modulated to contain a tone;
   wherein the at least one time slot containing the tone is modulated using a second modulation scheme different from the first modulation scheme, and the resulting tone has a frequency the first modulation scheme is unsuited to generate.

2. The method of transmitting signals from a radio device in a radio communication system as claimed in claim 1, wherein a frame assigned to a traffic channel is modulated using the second modulation scheme.

3. The method of transmitting signals from a radio device in a radio communication system as claimed in claim 1, wherein the second modulation scheme is such that a plurality of separate tones can be generated using the second modulation scheme.

4. The method of transmitting signals from a radio device in a radio communication system as claimed in claim 3, wherein each of the plurality of separate tones indicates a service capability of the transmitting radio device.

5. The method of transmitting signals from a radio device in a radio communication system as claimed in claim 4, wherein said service capability relates to the data traffic capability of the transmitting radio device.

6. The method of transmitting signals from a radio device in a radio communication system as claimed in claim 1, wherein the first modulation scheme is GMSK, and the second modulation scheme is 8PSK.

7. A radio device of a radio communication system, for transmitting signals comprising a plurality of frames, which carry control channels and traffic channels in a time division multiple access manner, each of the frames containing a plurality of timeslots, the radio device having:
   modulating means for modulating a carrier signal; and
   control means for controlling the modulating means during transmission of a signal, wherein
   the control means controls the modulating means to modulate a frame assigned to at least one control channel using a first modulation scheme; and
   the control means controls the modulating means to modulate at least one time slot of one of the frames to contain a tone;
   wherein the control means controls the modulating means to modulate the at least one time slot containing the tone using a second modulation scheme different from the first modulation scheme, and the resulting tone has a frequency the first modulation scheme is unsuited to generate.

8. The radio device as claimed in claim 7, wherein a frame assigned to a traffic channel is modulated using a second modulation scheme.

9. The radio device as claimed in claim 7, further comprising storage means for storing data relating to the tone, wherein the stored data is used during modulation of the at least one time slot containing the tone.

10. The radio device as claimed in claim 7, wherein the second modulation scheme is such that a plurality of separate tones can be generated using the second modulation scheme.

11. The radio device as claimed in claim 10, wherein each of the plurality of separate tones indicates a service capability of the transmitting radio device.

12. The radio device as claimed in claim 11, wherein said service capability relates to the data traffic capability of the transmitting radio device.

13. The radio device as claimed in claim 7, wherein the first modulation scheme is GMSK, and the second modulation scheme is 8PSK.

14. A radio device for receiving signals of a radio communication system, which signals of said radio communication system comprise a plurality of frames, which carry control channels and traffic channels in a time division multiple access manner, each of the frames containing a plurality of timeslots, wherein a frame assigned to at least one control channel is modulated using a first modulation scheme and at least one time slot of one of the frames of a signal is modulated to contain a tone, the radio device having
   means for receiving and demodulating a signal, wherein a frame assigned to a control channel of a received signal is demodulated using the first modulation scheme; and
   signal processing means to determine the presence of a tone in the at least one time slot of one of the frames of a received signal,
   wherein the signal processing means is adapted to determine whether the tone in a control frame of a received signal is a predetermined tone, wherein the frequency of the predetermined tone is one resulting from modulation of the at least one time slot containing the tone using a second modulation scheme different from the first modulation scheme, and is one the first modulation scheme is unsuited to generate.

15. The radio device as claimed in claim 14, wherein a frame assigned to a traffic channel is demodulated using the second modulation scheme.

16. The radio device as claimed in claim 14, wherein the second modulation scheme is such that a plurality of separate tones can be generated using the second modulation scheme, and wherein the predetermined tone is one of the plurality of tones.

17. The radio device as claimed in claim 16, wherein each of the plurality of separate tones indicates a service capability.

18. The radio device as claimed in claim 17, wherein said service capability relates to a data traffic capability.

19. The radio device as claimed in claim 16, having selecting means for selecting one of a plurality of radio frequency channels, and control means for controlling the selecting means to select a channel, wherein the control means controls the selecting means to select a radio frequency channel different from the currently received radio frequency channel in response to the failure of the signal processing means to detect a tone indicative of a desired service capability.

20. The radio device as claimed in claim 19, wherein the selecting means comprises an oscillator for converting a received radio frequency signal to baseband prior to demodulation.

21. The radio device as claimed in claim 14, wherein the first modulation scheme is GMSK, and the second modulation scheme is 8PSK.

22. A radio communication system comprising a plurality of radio devices as claimed in claim 14.

23. A method of receiving signals of a radio communication system in a radio device, which signals of said radio communication system comprise a plurality of frames, which carry control channels and traffic channels in a time division multiple access manner, each of the frames containing a plurality of timeslots, wherein a frame assigned to at least one control channel is modulated using a first modulation scheme and at least one time slot of one of the frames of a signal is modulated to contain a tone, wherein a frame assigned to the at least one control channel of a received signal is demodulated using the first modulation scheme; and the presence of a tone in at least one time slot of one of the frames of a received signal is determined, wherein it is determined whether the tone in a control frame of a received signal is a predetermined tone, wherein the frequency of the predetermined tone is one resulting from modulation of the at least one time slot containing the tone using a second modulation scheme different from the first modulation scheme, the frequency of the predetermined tone being one which the first modulation scheme is unsuited to generate.

24. The method of receiving signals as claimed in claim 23, wherein a frame assigned to a traffic channel is demodulated using the second modulation scheme.

25. The method of receiving signals as claimed in claim 23, wherein the second modulation scheme is such that a plurality of separate tones can be generated using the second modulation scheme, and wherein the predetermined tone is one of the plurality of tones.

26. The method of receiving signals as claimed in claim 25, wherein each of the plurality of separate tones indicates a service capability.

27. The method of receiving signals as claimed in claim 26, wherein said service capability relates to the data traffic capability.

28. The method of receiving signals as claimed in claim 25, wherein a radio frequency channel different from the currently received radio frequency channel is selected in response to a failure to detect a tone indicative of a desired service capability.

29. The method of receiving signals as claimed in claim 23, wherein the first modulation scheme is GMSK, and the second modulation scheme is 8PSK.

* * * * *